Figure 1:
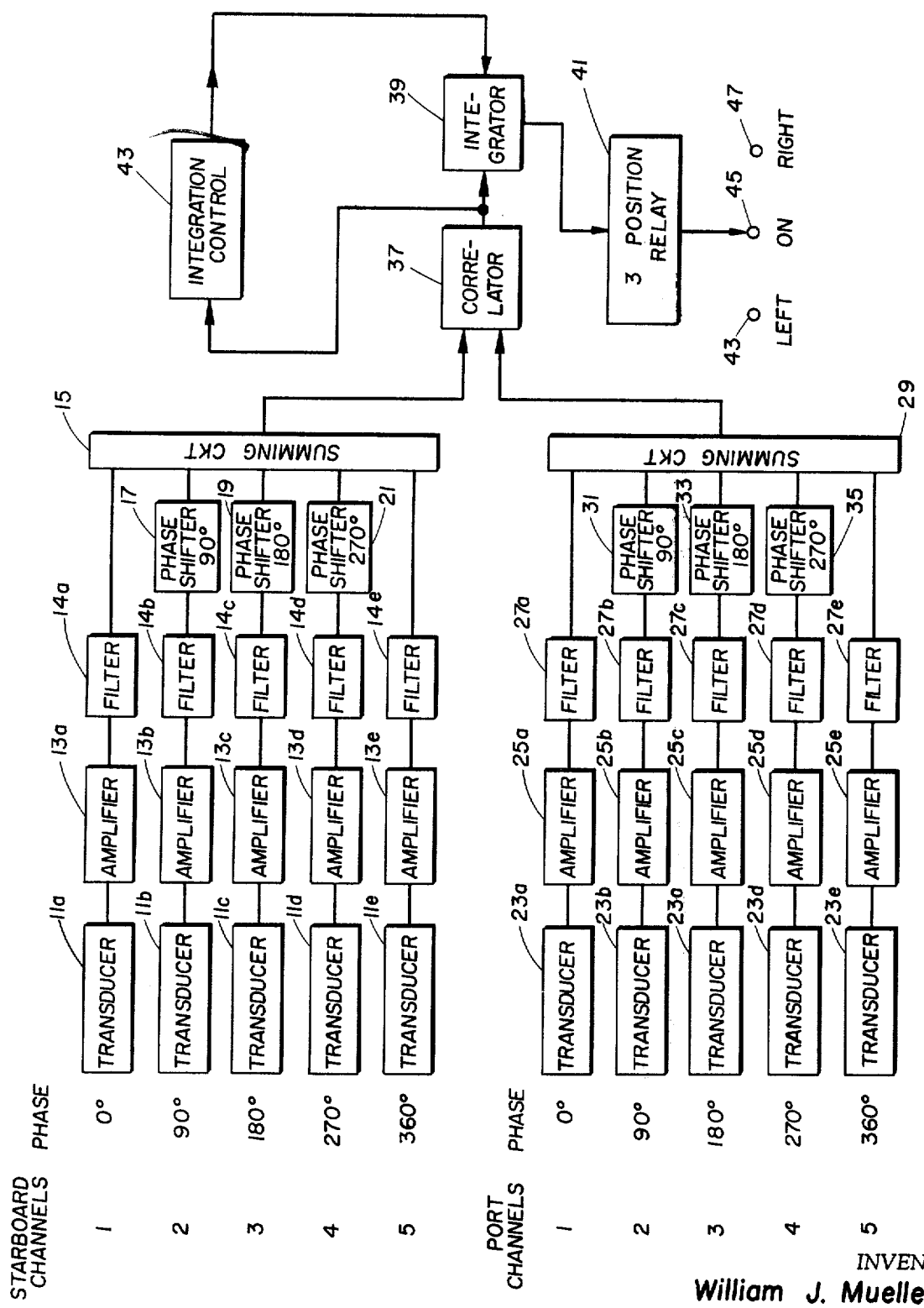

United States Patent [19]
Mueller

[11] 3,905,320
[45] Sept. 16, 1975

[54] LOW FREQUENCY HOMING SYSTEM

[75] Inventor: William J. Mueller, Newport, R.I.

[73] Assignee: The United States of America as represented by the Secretary of the Navy, Washington, D.C.

[22] Filed: June 30, 1964

[21] Appl. No.: 380,118

[52] U.S. Cl. .................................................. 114/23
[51] Int. Cl.² ....................................... F42B 19/06
[58] Field of Search ............. 114/23, 2; 340/6, 8, 9; 244/14.3

[56] References Cited
UNITED STATES PATENTS

| | | | |
|---|---|---|---|
| 1,971,688 | 8/1934 | Lange | 340/6 |
| 2,409,632 | 10/1946 | King | 114/23 |
| 2,897,351 | 7/1959 | Melton | 340/6 |

*Primary Examiner*—Verlin R. Pendegrass
*Attorney, Agent, or Firm*—R. S. Sciascia; J. A. Cooke

EXEMPLARY CLAIM

3. In a homing system for torpedoes, an elevator control system comprising,
 a first array of hydrophones axially aligned along the upper side of a torpedo,
 a second array of hydrophones axially aligned along the lower side of said torpedo,
 a correlator having a first input circuit, a second input circuit, and an output circuit,
 an integrator having a variable time constant dependent upon the distance between the torpedo and a target, said integrator having an input circuit and an output circuit,
 means connecting said first array of hydrophones to the first input circuit of said correlator,
 means connecting said second array of hydrophones to the second input circuit of said correlator whereby target signals received by said first array of hydrophones may be correlated with target signals received by said second array of hydrophones,
 means connecting said integrator to the output circuit of said correlator,
 means connecting said integrator selectively to a first or a second elevator control circuit of said elevator control system depending upon the polarity of an output voltage from said integrator.

6 Claims, 2 Drawing Figures

LOW FREQUENCY HOMING SYSTEM

The invention described herein may be manufactured and used by or for the Government of the United States of America for governmental purposes without the payment of any royalties thereon or therefor.

This invention relates to passive homing systems for a torpedo and more particularly to a low frequency homing system utilizing end fire arrays.

In homing systems for guiding torpedoes to a target the use of passive systems in prior art devices utilizing high frequencies suffer the disadvantage of greater sound transmission loss and the detection ranges are therefore limited. Active homing systems, on the other hand, alert the submarine or other target, allowing time for such targets to take evasive measures and launch decoys. Because of the narrow acoustic beam, snake or spiral search is required and the search rate is therefore reduced.

The low frequency homing system of this invention utilizes lines of hydrophones or transducers spaced along the port and starboard sides, and along the top and bottom sides of a torpedo. The signal reception region of each transducer element of each of the transducer lines provides an acoustic beam sensitive in the region ahead of the torpedo. After filtering to limit the band width providing a 90° phase shift between signals from the arrays on the sides of the torpedo, signals pass through the correlator and an integrator and then to the rudder bearing control system of the torpedo. Vertical steering is similarly obtained by using top and bottom arrays. The long integration time is used during the search and initial homing to obtain maximum sensitivity to the signals. The shorter integration period is used for close in homing to obtain a more rapid maneuvering capability. The size of the transducer elements is large to minimize disturbance from flow noise. The principal advantage of this sytem is that low frequency sound can be utilized in homing and passive homing capabilities can thereby be improved. Another advantage in using this type of an array is that radial beams can easily be provided for search while a torpedo is in a vertical dive. The use of phase shifting in beam forming avoids the need for bulky delay lines. Although phase shifting does not result in exact compensation over all the frequency bands, it does provide a null at all frequencies of self noise reflected from the surface or bottom. The wide acoustic beams permit searching large regions without need for snake or spiral search. Additionally, an advantage of this low frequency homing system is that it will not be effected by modern decoys because they do not operate at such low frequencies.

An object of this invention is to provide a low frequency passive homing system for underwater torpedoes.

Another object of this invention is to provide a low frequency passive acoustic homing system for underwater torpedoes in which end fire transducer arrays are employed.

A further object of this invention is to provide passive acoustic means for steering an underwater torpedo to a target.

Figure 2:
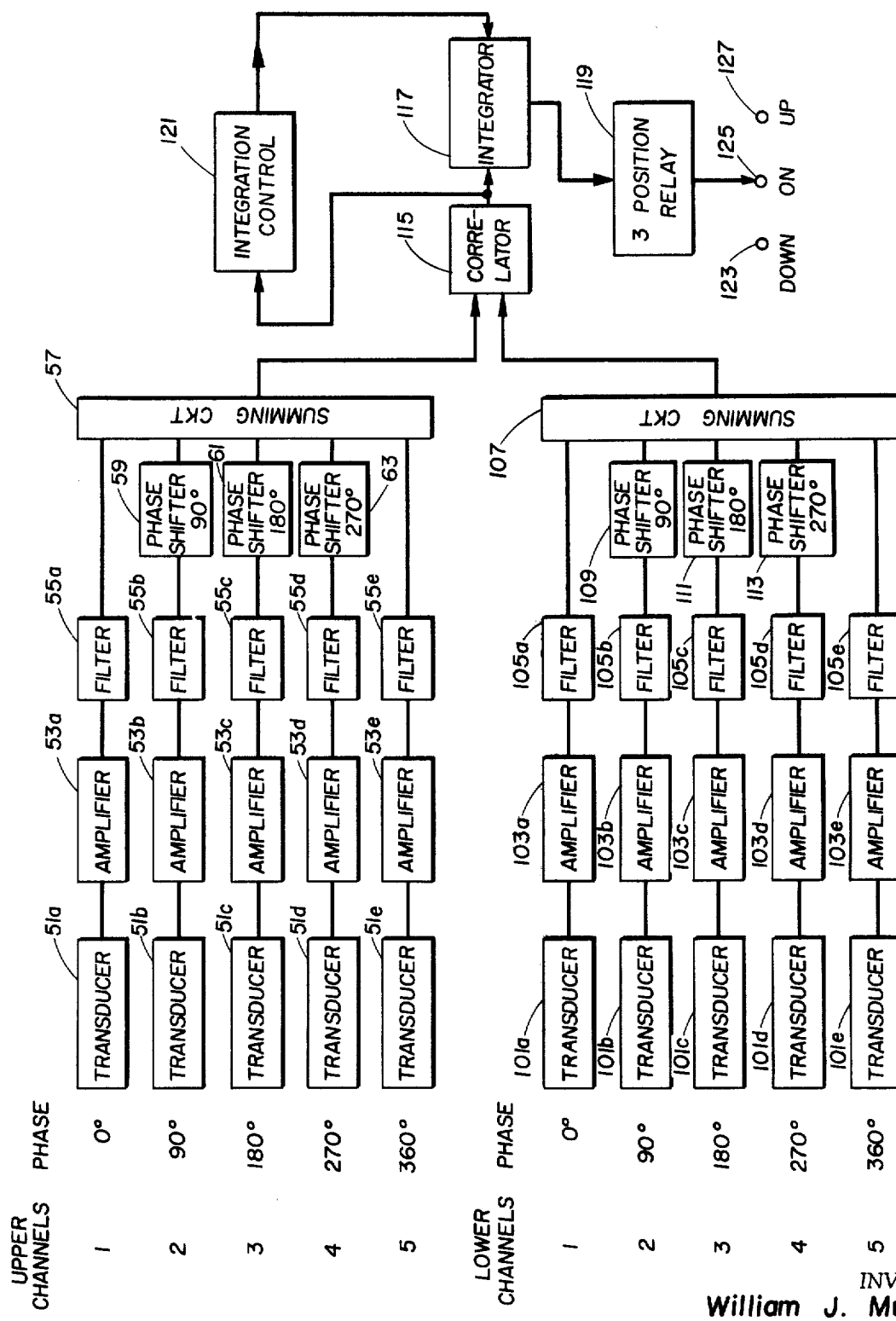

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 of the drawings illustrates a diagram of the low frequency homing system of this invention for the horizontal steering; and FIG. 2 illustrates a diagram of the vertical steering system of this invention.

Referring now to FIG. 1 of the drawings, in which a diagram of the horizontal steering system of the low frequency passive homing device is illustrated, the starboard or right channels 1, 2, 3, 4 and 5 and port, or left channels 1, 2, 3, 4, and 5 comprise, in part, the horizontal steering system of the instant invention. Channel 1 of the starboard system includes a transducer or hydrophone 11a connected to an amplifier 13a. Amplifier 13a is connected to filter 14a which is connected to a summing circuit 15. Transducer 11b of channel 2 is connected to amplifier 13b, filter 14b, and phase shifter 17 is connected to the summing circuit 15. Channel 3 of the starboard system includes transducer 11c, amplifier 13c, filter 14c, and phase shifter 19, connected to the summing device 15. Channel 4 includes a transducer 11d, amplifier 13d, filter 14d, and phase shifter 21. Channel 5 includes transducer 11e, amplifier 13e, filter 14e, and summing circuit 15. The port transducer array includes port channels 1, 2, 3, 4 and 5. Port channel 1 includes a transducer 23a connected to an amplifier 25a and a filter 27a. The filter 27a is connected to summing circuit 29. Channel 2 includes a transducer 23b, an amplifier 25b, a filter 27b and a phase shifter 31 having a phase shift of 90° and connected to the summing circuit 29. Channel 3 includes a transducer 23c, an amplifier 25c, a filter 25c and a phase shifter 33 having a 180° phase shift and connected to the summing channel 29. Channel 4 of the port array includes a transducer 23d, an amplifier 25d, a filter 27d and a phase shifter 35 which provides a phase shift to 270° and is connected to the summing circuit 29. Channel 5 includes a transducer 23e, an amplifier 25e, and a filter 27e. The filter 27e is connected to summing circuit 29. The output of summing circuits 15 and 29 are connected to first and second input circuits of correlator 37. The output circuit of correlator 37 is connected to the input circuit integrator 39. The output circuit of integrator 39 is connected to a three-position relay 41. The output of summing circuits 15 and 29 is also fed into an integration control device 43 which is connected to integrator 39. The three position relay 41 has a left position terminal 43, an "on" position terminal 45 and a right position terminal 47.

Referring now to FIG. 2 of the drawings in which a vertical steering system is shown, there are five upper channels and five lower channels. In channel 1 of the upper channels, the transducer 51a connected to an amplifier 53a which in turn is connected to a filter 55a. Filter 55a is connected to summing circuit 57. Channel 2 has a transducer 51b connected to an amplifier 53b and amplifier 53b is connected to filter 55b. Filter 55b is connected to a 90° phase shifter 59 which is connected to summing circuit 57. Channel 3 has a transducer 51c connected to amplifier 53c. Amplifier 53c is connected to filter 55c and filter 55c is connected to phase shifter 61 which has a 180° phase shift. Phase shifter 51 is connected to summing circuit 57. Channel 3 has a transducer 51c and an amplifier connected to amplifier 53c which is connected to a filter 55c. Filter 55c is connected through a 180° phase shifter 61 to summing circuit 57. Channel 4 includes a transducer 51d connected to an amplifier 53d and amplifier 53d is connected to filter 55d. Filter 55d is connected through a 270° phase shifter 63 to summing circuit 57. Channel 5 includes a transducer 51e connected to amplifier 53e and amplifier 53e is connected to filter 55e. Filter 55e is connected directly to the summing circuit 57.

In the lower transducer channels, channel 1 includes transducer 101a connected to amplifier 103a which is connected to filter 105a. Filter 105a is connected to summing circuit 107. Channel 2 includes a transducer 101b connected to amplifier 103b which is connected to filter 105b. Filter 105b is connected through the 90° phase shifter 109 to summing circuit 107. Channel 3 comprises a transducer 101c connected to amplifier 103c which is connected to the filter 105c. Filter 105c is connected to summing circuit 107 through 180° phase shifter 111. Channel 4 includes transducer 101d connected to amplifier 103d which is connected to filter 105d. Filter 105d is connected through 270° phase shifter 113 to summing circuit 107. Channel 5 includes a transducer 101a connected to an amplifier 103a. Amplifier 103a is connected to filter 105a. Filter 105a is connected to summing circuit 107. The outputs of summing circuits 57 and 107 are connected to input circuits of correlator 115. The output circuit of correlator 115 is connected to the input circuit of integrator 117. The output circuit of integrator 117 is connected to three position relay 119. The output of summing circuits 57 and 107 are also connected to ingegration control circuit 121. The integration control circuit 121 connects to integrator 117. The three position relay 119 has a DOWN terminal 123, an ON terminal 125, an UP terminal 127.

Referring now to FIG. 1 of the drawings for operation of the horizontal steering system, it is noted that the transducers 11a, 11b, 11c, and 11d are each separated by a phase of 90°. For example, the phase of transducer 11a of channel 1 is 0° and in channel 2 transducer 11b has a phase of 90°. Transducer 11c has a phase of 180°, and transducer 11d has a phase of 270°. Transducer 11e of channel 5 has a phase of 360° which is the same as 0°. The 90° displacement between the adjacent transducers or channels represents the time lag which occurs because of the physical distance between the transducers and the time for acoustic waves to travel this distance. In other words, at the frequency for which the system is adapted to operate, the physical distance between transducers is set to have a time lag of the sound signal as it travels from one channel or transducer to the next which is equal to the phase shift or displacement of 90° at the operating listening frequency. Since, for example, the transducer 11a in channel 1 is physically located at the front of the transducer array of the starboard system, no phase shifter is used in this channel. In channel 2 of the starboard system a 90° phase shifter 17 is employed. This phase shift represents the time necessary for a sound wave to travel the distance between the transducer 11a of channel 1 and the transducer 11b of channel 2. Channel 3 includes a 180° phase shifter 19 which provides an additional 90° phase shift from the transducer of channel 2. Channel 4 is a 270° phase shifter which provides a 90° phase shift between channels 4 and 3. In channel 5 a 90° phase shift between channel 5 and channel 4 would mean a phase of 360° which is the same as 0° and therefore no phase shifter is needed in channel 5. In actual practice, phase shifter 17 in channel 2 may be a 90° phase shifter, phase shifter 19 of channel 3 which provides 180° phase shift may be a phase inverter, and phase shifter 21 of channel 4 which is 270° may be a phase inverter plus a 90° phase shifter. Thus the entire phase shifting between all of the channels is provided by two 90° phase shifters and two phase inverters. The phase relationship of the five port channels is the same as that of the starboard channels. With the phase shift thus provided between the starboard channels, the signals which are picked up by the transducers 11a, 11b, 11c, 11d and 11e are presented to the summing circuit 15 in phase and therefore the amplitude of the signal from summing circuit 15 is a result of vector addition of the individual signals from channels 1–5. Similarly the signals appearing in the five port channels in transducers 23a, 23b, 23c, and 23d and 23e are presented to the summing circuit 29 in an in-phase relationship and may be added vectorially by the summing circuit.

The summation of the output signals of the five transducers of the starboard channels is fed into correlator 37 from summing circuit 15 as is the summation of the signals of the transducers of the five port channels from summing circuit 29. The two summation signals from summing circuits 15 and 29 are then multiplied together or correlated in the correlator 37 and fed to the integrator circuit 39. The output from correlator 37 will be a signal which is predominantly positive, predominantly negative, or in which the average is zero. Suppose that the output of the summing signal from the starboard channels leads in phase that of the port channels, then the output from the correlator will be predominantly positive, for example. On the other hand if the signal from the summation circuit 29 of the port channels leads in phase that from the summation circuit of the starboard channel, the output from the correlator will then be predominantly negative. The predominantly positive, negative, or zero voltage from correlator 37 is then fed into integrator 39 which will average out in this signal over a desired period of time depending upon the distance that the torpedo is from the target. The integrator circuit is essentially an RC time circuit which averages the signal from correlator 37 and applies this average signal to the three position relay 41. The output signal or voltage from integrator 39 will be an average signal from the correlator which will be either positive, negative or zero. When a positive voltage from integrator 39, for example, is applied to the polarity sensitive three position relay 41, the relay will be energized in a manner to connect RIGHT terminal 47 to a source of electrical power. Terminal 47 may be connected to a rudder control system in such a manner that the rudder will be moved to the right when RIGHT terminal 47 is energized. If, on the other hand, a negative signal is fed from integrator 39 to the three position relay 41, then contact will be made between a source of electrical power and LEFT terminal 43 and the rudder will be moved to the left by a rudder control system connected to LEFT terminal 43. If the summation of the signals from the summing circuit 15 should be equal in phase to the output of the signal from summing circuit 29 then the multiplication of the signals in correlator 37 will produce a signal which averages zero. When this signal from the correlator is averaged in the integrator 39 there will be a zero output voltage from integrator 39 and the relay will be in the neutral or ON position, that is, contact will be made with terminal 45 and the rudder will be in a neutral position in which case the torpedo will be on course and no corrective steering by the rudder is necessary.

Referring now to FIG. 2 of the drawings in which the elevator control system of the torpedo is illustrated, the compressional wave signals received by transducers 51a, 51b, 51c, 51d, and 51e of the UP channels are fed into summing circuit 57 in the same manner as in the starboard channel of FIG. 1. Compressional wave signals received by transducers 101a, 101b, 101c, 101d, and 101e are similarly fed into summing circuit 107. The summation signal from summing circuit 57 and the summation signal from summing circuit 107 are fed into the correlator 115 and the two signals are multiplied together or correlated and applied to the correlated signal from correlated 115 is applied to the input of integrator 117. The output from integrator 117, that is, the integrated, correlated, signal from the UPPER and the LOWER channels are then fed into the three position relay 119. The output of the correlator 115 will be a signal which is predominantly positive, predominantly negative, or having an average of zero. The integration time is determined by integration control circuit 121. A long integration time is used during search and initial homing to obtain maximum sensitivity to each signal and then a short integration period is used for close in homing to obtain more rapid moving capability. Integration control device 121 may vary the RC time constant of integrator 117. The output voltage of integrator 117 will be positive, negative, or zero, depending upon relative phases of the summation signals from summing circuit 57 and summing circuit 107. If the summation signal from summation circuit 57 leads in phase the summation signal from summing circuit 107, for example, the correlated or multiplied voltage from correlator 115 will be predominantly positive, and when this voltage is passed through the integrator, the signal from integrator 117 will be positive causing the application of a positive voltage to be applied to three position relay 119, for example. This will cause contact to be made between a source of electrical power, not shown, and the UP terminal 127 of the relay 119. UP terminal 127 may be connected to an elevator control system such that the elevators of the torpedo will be in an UP position when terminal 127 is connected to a source of electrical power. If the summation signal from summing circuit 107 leads in phase the summation signal of the output of summing circuit 57, for example, then the correlated signal from correlator 115 will be predominantly negative and the output from integrator 117 will be negative. The negative signal output from integrator 117 will cause the DOWN terminal of three position relay 119 to be connected to a source of electrical power. DOWN terminal 123 may be connected to an elevator control system in such a manner as to cause the elevators to be in a DOWN position. When the signals from summation circuit 57 and 107 are equal in phase, the correlated output will be equally positive and negative and the integrated signal will be zero. The three position relay will be in the central or on course position, connecting ON terminal 125 to an elevator control system. The correlator circuits of this invention may be standard multipliers or polarity coincidence type correlators. The integration control devices such as integration control device 43 or integration control device 121 may be any device which changes the resistance of the RC circuit of integrator 117 in proportion to the magnitude of the signals appearing at the output of summation circuits 15 and 29 or summation circuits 57 and 107. Such a device may be a motor control device in which the angular position of the potentiometer may be changed in accordance with the magnitude of the input signal from the summing circuits. Another example of an integration control device may be a thermistor in which the signals, or a portion of the signals, of the summation circuits would be fed to the heating element of the thermistor to change the resistance of the thermistor element. The thermistor element would be part of the RC circuit of the integrator, and the resistance of the thermistor would change in proportion to the change in magnitude of the received signals. As the torpedo approaches the target, the signals would have a larger amplitude and the integration time is decreased by changing the values of one of the resistance elements of the integrator circuit elements.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. A low frequency homing system for torpedoes comprising, a first plurality of transducers coaxially aligned and disposed horizontally along the starboard side of a torpedo, a second plurality of transducers axially aligned and horizontally disposed on the port side of said torpedo, a third plurality of transducers coaxially aligned and horizontally disposed along the upper side of a torpedo, a fourth plurality of transducers coaxially aligned and disposed horizontally along the lower side of said torpedo, a first summing circuit, each of said transducers in said first plurality of transducers being connected through an amplifier circuit, a filter circuit and a phase shift circuit to said first summing circuit whereby a signal received by said first plurality of transducers will be added in an in-phase relationship in said summing circuit, a second summing circuit, each of the transducers in said second plurality of transducers being connected to an amplifier circuit, a filter circuit and a phase shift circuit connected to said second summing circuit whereby compressional signals received by said second plurality of transducers may be applied in an in-phase relationship to said second summing circuit, a first correlator means, means connecting the output of said first and second summing circuits to first and second input circuits of said correlator means, an integrator means, means connecting an output circuit of said correlator means to said integrator means, an integration control circuit, means connecting the output circuit of said correlator to the input of said integration control circuit, means connecting an output circuit of said integration control circuit to said integrator means, a three position relay, means connecting the output of said integrator to the energizing windings of said three position relay, first rudder control means connected to a first pair of contacts of said three position relay, a second rudder control means connected to a second pair of contacts in said three position relay whereby a positive signal from said integrator will close said first pair of contacts and energize said first rudder control means and a negative signal applied from said integrator to said three position relay will close said second pair of contacts in said second rudder control means to control the horizontal steering of said torpedo toward a target, each of said third plurality of transducers connected to a third summing circuit through an amplifier, a filter and a phase shift circuit, each of said fourth plurality of transducers being connected to a fourth summing circuit through an amplifier, a filter and a phase shift circuit whereby signals of said fourth plurality of transducers may be applied to said fourth summing circuit in an in-phase relationship, a second correlator means, means connecting the output of said third summing circuit and said fourth summing circuit to said second correlator means, an integrator circuit, means connecting the output of said second correlator means to said second integrator circuit, a second three position relay, a first elevator control circuit including a first pair of contacts on said second three position relay, a second elevator control circuit including a second pair of contacts in said second three position relay, an integrator control circuit having an input circuit connected to an output circuit of said correlator means, and an output circuit connected to said second integrator means whereby the integration time constant is varied in accordance with the magnitude variation of the output signals from said third and fourth summing circuits, means connecting said third integrator to said second three position relay whereby a positive signal applied from the output of said integrator to said relay will cause a first pair of contacts connected to an elevator control circuit to close and a negative signal applied from the output of said integrator to said second three position relay will cause said second pair of contacts in said second elevator control circuit to close whereby the vertical steering of the torpedo to a target may be obtained.

2. A low frequency passive homing system for underwater torpedoes comprising, a first array of transducers arranged in a line along the starboard side of a torpedo, a second array of transducers arranged in a line along the port side of said torpedo, a third array of transducers arranged in a line along the upper side of said torpedo, a fourth array of transducers arranged in a line along the lower side of said torpedo, a first correlator means having a first input circuit, a second input circuit and an output circuit, a first integrator means having an input circuit and an output circuit, means connecting said first array of transducers to said first input circuit of said first correlator means, means connecting said second array of transducers to said second input circuit of said first correlator means, means connecting the output circuit of said first correlator means to the input circuit of said first integrator means, a first electromagnetic relay means having a first pair of contacts and a second pair of contacts, a first rudder control circuit means, a second rudder control circuit means, means connecting the output circuit of said first integrator means to said first electromagnetic relay, means connecting said first rudder control circuit means to the first pair of contacts of said first electromagnetic relay, means connecting said second rudder control circuit means to the second pair of contacts of said second electromagnetic relay, said first pair of contacts operable to close relay when a positive voltage is applied to said first relay from said first integrator means and said second pair of contacts of said first relay means operative to close when a negative signal is applied to said first relay means from said first integrator means, a second correlator means having a first input circuit, a second input circuit and an output circuit, a second integrator means having an input circuit and an output circuit, means connecting said third array of transducers to said first input circuit of said second correlator means, means connecting said fourth array of transducers to said second input circuit of said second correlator means, means connecting the output circuit of said second correlator means to the input circuit of said second integrator means, a second electromagnetic relay means having a first pair of contacts and a second pair of contacts, a first elevator control circuit means, a second elevator control circuit means, means connecting the output circuit of said second integrator means to said second electromagnetic relay, means connecting said first elevator control circuit means to the first pair of contacts of said second electromagnetic relay, means connecting said second elevator control circuit means to said second pair of contacts of said second electromagnetic relay means, said first pair of contacts operative to close when a positive voltage is applied to said second relay means from said second integrator means, and said second pair of contacts operative to close when a negative voltage is applied to said second relay means from said second integrator means.

3. In a homing system for torpedoes, an elevator control system comprising, a first array of hydrophones axially aligned along the upper side of a torpedo, a second array of hydrophones axially aligned along the lower side of said torpedo, a correlator having a first input circuit, a second input circuit, and an output circuit, an integrator having a variable time constant dependent upon the distance between the torpedo and a target, said integrator having an input circuit and an output circuit, means connecting said first array of hydrophones to the first input circuit of said correlator, means connecting said second array of hydrophones to the second input circuit of said correlator whereby target signals received by said first array of hydrophones may be correlated with target signals received by said second array of hydrophones, means connecting said integrator to the output circuit of said correlator, means connecting said integrator selectively to a first or a second elevator control circuit of said elevator control system depending upon the polarity of an output voltage from said integrator.

4. In a homing system for torpedoes, a horizontal steering system comprising, a first array of hydrophones axially aligned along the starboard side of a torpedo, a second array of hydrophones axially aligned along the port side of said torpedo, a correlator having a first input circuit, a second input circuit, and an output circuit, an integrator having a variable time constant dependent upon the distance between the torpedo and a target, said integrator having an input circuit and an output circuit, means connecting said first array of hydrophones to the first input circuit of said correlator, means connecting said second array of hydrophones to the second input circuit of said correlator whereby target signals received by said first array of hydrophones may be correlated with target signals received by said second array of hydrophones, means connecting said integrator to the output circuit of said correlator, means connecting said integrator selectively to a first or a second horizontal steering circuit of said horizontal steering system depending upon the polarity of an output voltage from said integrator.

5. In a passive acoustic homing system for a torpedo, an elevator control system comprising, a correlator having a first signal input circuit, a second signal input circuit, and a correlated voltage output circuit, a first transducer array axially aligned along the upper side of a torpedo, a second transducer array axially aligned along the lower side of said torpedo, means connecting said first transducer array to the first signal input circuit of said correlator , means connecting said transducer array to the second signal input circuit of correlator, an integrator having RC time constant elements, an input circuit and an output circuit, an integration control means having an input circuit, and an output circuit, means connecting the output circuit of said correlator to the input circuit of said integrator, means connecting the input circuit of said integration control means to the input circuit of said integrator, a polarity sensitive relay having an energizing circuit, a first pair of contacts and a second pair of contacts, said relay operative to close said first pair of contacts when a positive voltage is applied to said energizing circuit and operative to close said second pair of contacts when a negative voltage is applied to said energizing circuit, means connecting the output circuit of said integrator to said energizing circuit, means connecting said first pair of contacts to a first elevator control circuit of said elevator control system, means connecting said second pair of contacts to a second elevator control circuit of said elevator control system, means connecting the output circuit of said integration control means to an element of said integrator whereby the integration time may be varied.

6. In a passive acoustic homing system for a torpedo, a horizontal steering control system comprising, a correlator having a first signal input circuit, a second signal input circuit, and a correlated voltage output circuit, a first transducer array axially aligned along the starboard side of a torpedo, a second transducer array axially aligned along the port side of said torpedo, means connecting said first transducer array to the first signal input circuit of said correlator, means connecting said second transducer array to the second signal input circuit of correlator, an integrator having RC time constant elements, an input circuit and an output circuit, an integration control means having an input circuit and an output circuit, means connecting the output circuit of said correlator to the input circuit of said integrator, means connecting the input circuit of said integration control means to the input circuit of said integrator, a polarity sensitive relay having an energizing circuit, a first pair of contacts and a second pair of contacts, said relay operative to close said first pair of contacts when a positive voltage is applied to said energizing circuit and operative to close said second pair of contacts when a negative voltage is applied to said energizing circuit, means connecting the output circuit of said integrator to said energizing circuit, means connecting said first pair of contacts to a first horizontal steering circuit of said horizontal steering system, means connecting said second pair of contacts to a second horizontal steering circuit of said horizontal stering system, means connecting the output circuit of said integration control means to an element of said integrator whereby the integration time may be varied.

* * * * *